Sept. 15, 1942.  M. MALLORY  2,295,856
APPARATUS FOR MACHINING PREFORMED HOLES
Filed April 28, 1939   3 Sheets-Sheet 1

INVENTOR.
MARION MALLORY.
BY
Barnes, Kisselle, Laughlin & Raisch
ATTORNEYS.

Sept. 15, 1942.　　　M. MALLORY　　　2,295,856
APPARATUS FOR MACHINING PREFORMED HOLES
Filed April 28, 1939　　　3 Sheets-Sheet 2
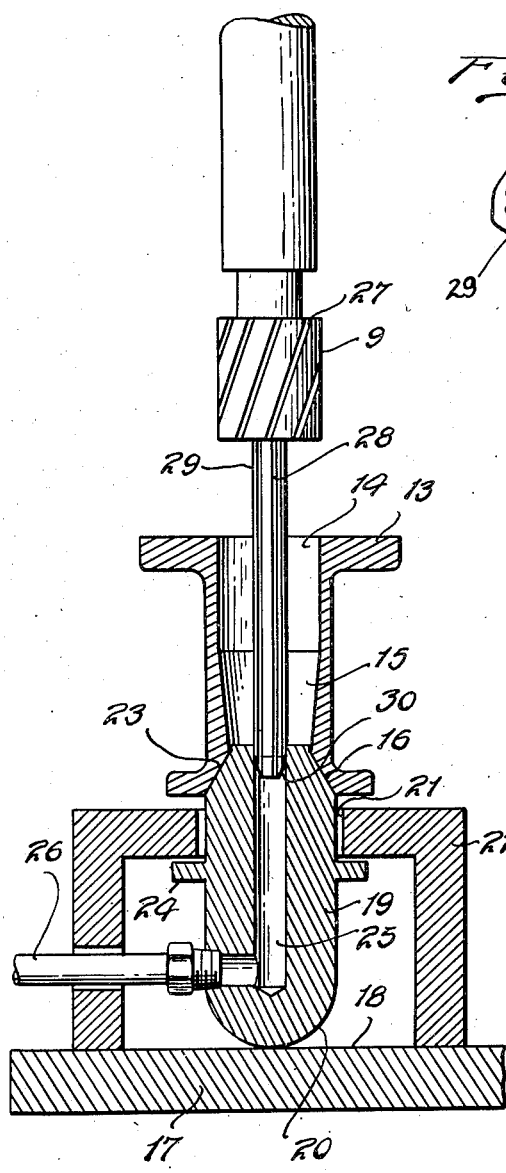
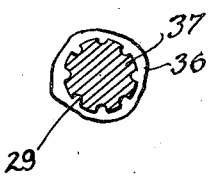
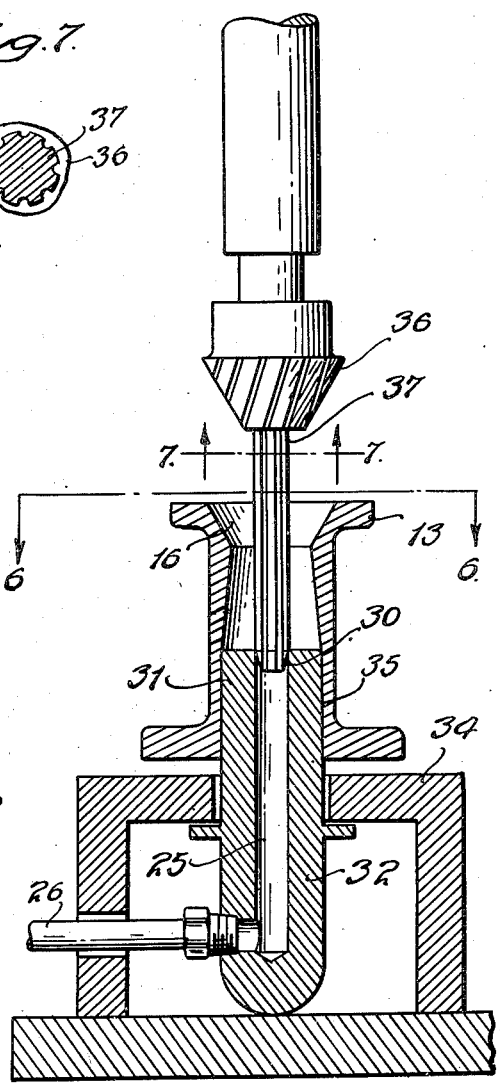
INVENTOR.
MARION MALLORY.
BY Barnes, Kisselle, Laughlin & Raisch
ATTORNEYS Sept. 15, 1942.  M. MALLORY  2,295,856
APPARATUS FOR MACHINING PREFORMED HOLES
Filed April 28, 1939  3 Sheets-Sheet 3
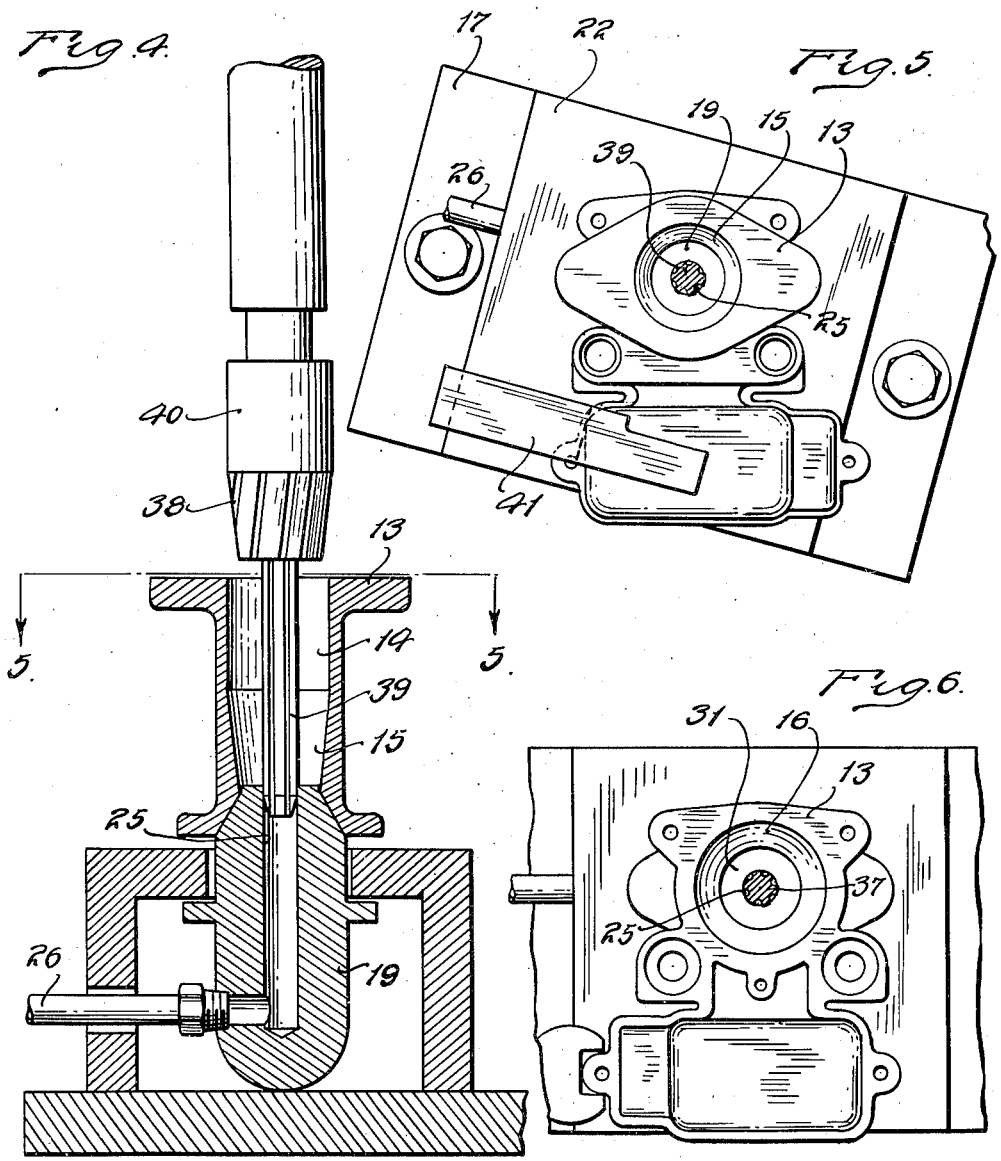
INVENTOR.
MARION MALLORY.
BY Barnes, Kisselle, Laughlin & Raisch
ATTORNEYS.

Patented Sept. 15, 1942

2,295,856

UNITED STATES PATENT OFFICE 2,295,856

APPARATUS FOR MACHINING PREFORMED HOLES

Marion Mallory, Detroit, Mich., assignor to The Mallory Research Company, Detroit, Mich., a corporation of Michigan Application April 28, 1939, Serial No. 270,623

6 Claims. (Cl. 77—62)

This invention relates to an apparatus for machining preformed holes.

It has been customary in the art of machining holes, such, for example, as the cored Venturi passageway in a cast carbureter housing, to set up or lock the carbureter housing on the machine so that the hole to be machined is accurately aligned with the axis of the cutting tool. In machining such a Venturi passageway several machining operations are necessary. In these machining operations different cutting tools are used and some tools enter the cored hole from one end whereas others enter it from the other end. This necessitates reversing the housing upon its holder. With each machining operation it is necessary to set up the housing on the machine as above mentioned. This procedure in the machining of preformed holes in a cast carbureter housing is slow and uneconomical due to the complicated steps involved in setting up the work on the machine. The above reference to machining a Venturi passageway in a carbureter housing is illustrative only.

It is the object of this invention to produce an apparatus for machining or finishing holes which have been previously formed in metal, metal alloys, or other solid materials which is more simple and efficient in operation than apparatuses heretofore used for the same purpose. This object is achieved by means of a cutting tool having a pilot and a floating combined work locator and pilot guide, the pilot cooperating with the combined guide and work locator to center the latter with the cutting tool and the work locator serving to center the work with the cutting tool.

In the drawings:

Fig. 2 is a detail sectional view showing the first machining operation on one portion of the Venturi passageway in a carbureter housing.

Fig. 3 shows the second machining operation on the carbureter housing venturi.

Fig. 4 shows the final machining operation on the carbureter venturi.

Fig. 5 is a section along the line 5—5 of Fig. 4.

Fig. 6 is a section along the line 6—6 of Fig. 3.

Fig. 7 is a section through the pilot along the line 7—7 of Fig. 3.

Figure 1:
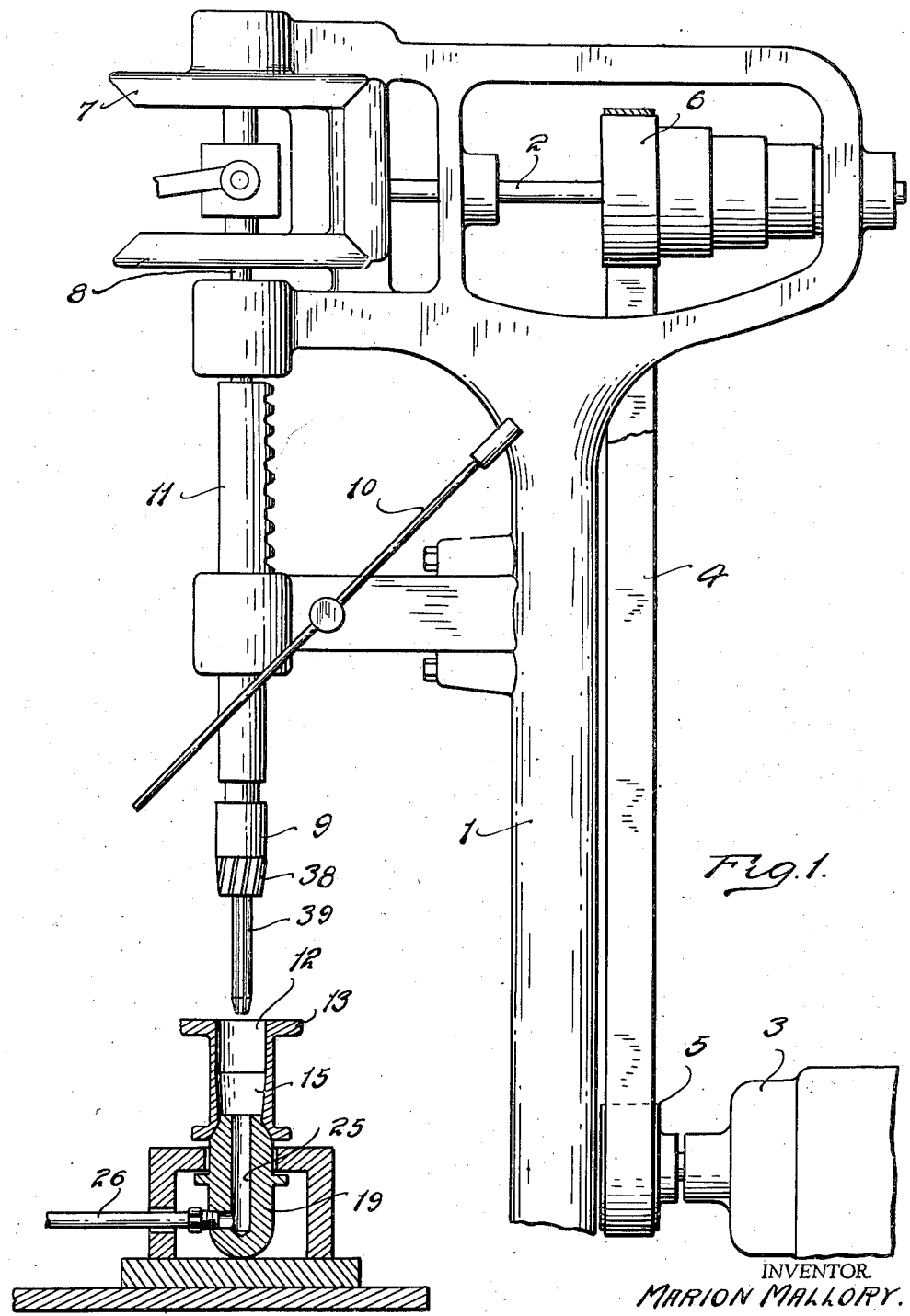
Fig. 1 is an assembly view partly in section showing a rotary cutter machine provided with a floating combined pilot guide and work locator.

Referring more particularly to the drawings there is shown a rotary cutting machine comprising a frame 1 in which is journaled a driving shaft 2. The shaft 2 is driven by the electric motor by means of a belt 4 which runs on the pulley 5 of the motor and the pulley 6 on the drive shaft 2. The frame 1 also supports a housing 7 for a set of gears (not shown) which transfers the driving torque from shaft 2 to the vertical shaft 8 which drives and rotates the cutting tool 9 (Fig. 2). The specific drive between the shaft 8 and the cutting tool 9 will not be described in detail because it forms no part of this invention and is conventional and well-known. However, rotation of the hand lever 10 lowers and raises the holder 11 for the tool 9, thus feeding the rotary cutting tool 9 into the hole to be machined and retracting the same therefrom.

For descriptive purposes and not by way of limitation the apparatus is shown machining the Venturi passageway 12 in a carbureter housing 13. The carbureter housing 13 is cast from any suitable metal, such as aluminum, with the unfinished or rough opening 12 therein. The Venturi passageway comprises a cylindrical portion 14, a conical portion 16 and an intermediate conical portion 15 (Fig. 2).

The machine is provided with a support 17 having a flat upper face 18 upon which rests the combined work locator and pilot guide member 19. The base 20 of the member 19 is preferably rounded or spheroidal so that it will rock freely in all directions upon the face 18. The upper end of the member 19 projects through an opening 21 in the cover 22. The circumference of the opening 21, which is preferably circular, is greater than the circumference of the member 19 which is likewise preferably of circular section so that there is a clearance between the member 19 and the opening 21. The member 19 thus is freely floating in the enlarged opening 21. The upper end 23 of the member 19 is conical. The member 19 is retained within the cover 22 by a circumferential flange 24 positioned within and spaced from cover 22. The member 19 is also provided with a vertical elongated hole 25 which extends along the vertical axis of the member 19. This hole 25 is connected to a flexible tube 26 through which lubricating liquid upper pressure is forced upwardly through holes 25 and hole 12 in carbureter housing 13 and upwardly through the flutes 27 of and by and around the cutting tool 9. This lubricating fluid, as explained in my copending application Serial No. 267,013, filed April 10, 1939, serves to remove the cuttings from the opening 12 and away from the working edge of the tool.

The cutting tool 9, which in this instance is a reamer, is provided with a pilot 28 which depends from the reamer along its vertical longitudinal axis. This pilot is shown in cross section, Fig. 7, and is provided with a plurality of flutes 29 in which the lubricating liquid flows as it travels upwardly through opening 25. The outer circumference of the pilot 29 is very slightly smaller than the circumference of opening 25 so that the pilot 29 has a tight sliding fit in opening 25.

In machining the opening 12 the cylindrical portion 14 is first machined to size. This is accomplished by placing the carbureter housing 13 upon the conical surface 16 of the locator 19, as shown in Fig. 2. At this time the pilot 28 is above the housing 13 and free from the locator 19. Since the pilot is not in guide opening 25 the locator 19 may not and need not necessarily be in a vertically upright position but may be tilted to one side within the limits of the clearance provided by opening 21. However, as soon as the tool 9 is lowered the tapered end 30 of the tool enters the mouth of guide opening 25 and cams the member 19 into alignment with the longitudinal axis of the reamer 9. The pilot 28 is guided in the opening 25 and thus throughout the reaming operation keeps the locator centered with the reaming tool. As the reaming tool is lowered into contact with the housing, as soon as the reamer contacts the housing and exerts downward pressure on the same, the conical surface 23 centers the housing 13 relative to the tool 9. In doing this the conical surface 23 cooperates with the lower end of the housing in a manner similar to a ball and socket joint. The reamer 9 is now lowered further into the opening 14 and thereupon cuts the opening 14 to finished size. Thereafter the reamer 9 and pilot 28 are retracted out of hole 12. The housing 13 is then inverted and the now finished hole 14 is slipped over the upper end 31 of the pilot guide and locator 32 (Fig. 3).

Locator 32 is identical with member 19 except that the portion 31 which projects above cover 34 has a cylindrical surface 35 having a circumference very slightly smaller than the circumference of finished opening 14. Thus locator portion 31 has a tight sliding fit with the housing 13 in finished opening 14 (Fig. 3). After the housing 13 is slipped over locator 32, the rotary cutting tool 36 having a pilot 37 identical with pilot 28 is lowered. As soon as pilot 37 enters guide hole 25, locator 32 is centered with pilot 37 and cutting tool 36. As cutting tool 36 machines the conical portion 16 to size, this hole necessarily must be centered with the finished hole 14. The tool 36 and pilot 37 is now withdrawn and the housing 13 is again inverted to the same position shown in Fig. 2 and placed upon a locator 19 as shown in Fig. 4. Locator 19 in Fig. 4 is identical with that shown in Fig. 2.

Reamer 38, having pilot 39 identical with pilot 28, is now lowered. Pilot 39 centers locator 19 with the reamer 38 and as the reamer 38 moves into finished cylindrical opening 14, the housing 13 is centered with respect to reamer 38. The cylindrical pilot portion 40 of reamer 38 next enters the previously machined cylindrical portion 14 with which it has a tight sliding fit. Cylindrical portion 40 acts through cylindrical opening 14 to hold the housing 13 centered while reamer 38 machines intermediate conical portion 15 to size. Thereafter the reamer 38, pilot 39 and pilot 40 are withdrawn and the work removed. During all the machining operations the housing 13 is held against rotation by the stop 41 which is fixed to the support 17.

It is evident from the above description that the machining of the preformed opening 12 in the housing 13 results in accurately centering or aligning the longitudinal axes of the portions 14, 15 and 16 of the Venturi passageway. Further, during the operation of the apparatus it is evident that the work is automatically centered with the cutting tool for each machining operation by merely placing the same over the combined pilot guide and locator, thus avoiding laborious centering of the work preparatory to the machining operation as heretofore practiced.

I claim:

1. Apparatus for machining an article having a hole therein comprising a rigid support, a locator resting upon the said support and rockable thereon and arranged to contact the article in one end of the said opening, a guideway carried by said locator, a machining tool adapted for advancement into the end of the hole in said article opposite the said locator, and pilot means for said machining tool arranged to engage the guideway in said locator before the machining tool begins to machine the said article whereby the locator and article are centered with the machine tool for the machining of said hole.

2. Apparatus for machining an article having a hole therein comprising a support, a locator having a rounded end resting upon said support and having a limited rocking movement thereon, the other end of said locator adapted to contact the article in said opening, a cylindrical opening along the longitudinal axis of said locator, a machining tool adapted for advancement into the hole in said article opposite the said locator, and a pilot extending axially from said machining tool arranged to project into and to have a tight sliding fit with the hole in said locator before the machining tool begins to machine the article whereby the hole in said article and locator are centered with the machining tool for the machining of said hole.

3. An apparatus for machining a plurality of portions of a preformed hole in an article so that all of the machined portions of the hole will be in accurate axial alignment comprising a rockable locator having a guideway concentric with its longitudinal axis and having a portion arranged to be inserted into and have a snug fit within a machined end portion of the hole, said end portion of the rockable locator having the same external contour as the machined portion of the hole, said locator and said machined portion of the hole in the article having a common longitudinal axis, a rotary machining tool arranged for advancement into the said hole opposite the said locator for machining another portion of said hole, pilot means mounted in axial alignment with said machining tool adapted for advancement ahead of said machining tool into the guideway in said locator whereby the pilot and guideway cooperate to center the locator, the machined portion of the hole and the machining tool before the machining tool machines the said other portion of the hole.

4. Apparatus for machining an article having a preformed hole therein comprising a stationary support, a locator mounted upon said support and tiltable in any direction, said locator having a seat for the article to be machined, said seat adapted to engage the said article in the opening to support the article whereby the article is tiltable with the locator, a machining tool arranged for advancement into the said hole opposite the locator for machining the said hole, cooperating guide member and pilot member carried by the said machining tool and locator, one of said members being mounted in axial alignment with said machining tool, said pilot member being adapted for advancement into said guide member whereby the pilot and guide cooperate to center the locator and hole in the article to be machined with the machining tool before the machining tool machines the said hole.

5. Apparatus for machining an article having a preformed hole therein comprising a stationary support, a locator mounted upon said support and tiltable in any direction, said locator having a seat for the article to be machined, said seat adapted to engage the said article in the opening to support the article whereby the article is tiltable with the locator, a rotary machining tool arranged for advancement into the said hole opposite the locator for machining the said hole, cooperating guide member and pilot member carried by the said machining tool and locator, one of said members being mounted in axial alignment with said machining tool, said pilot member being adapted for advancement into said guide member to center the locator, machining tool and the hole in the article to be machined, and a stop against which the article to be machined abuts to prevent rotation of the same on the locator.

6. An apparatus for machining a plurality of axially aligned portions of a preformed hole in an article, one of said portions having been previously machined, said apparatus comprising a floating locator arranged to engage the said article adjacent an end of said hole, a machining tool adapted for advancement into said hole in the article for machining the same, a guide member and a pilot member, one of which is carried by the locator and the other of which is carried by the machining tool, said pilot member being adapted for advancement into said guideway preparatory to the machining operation, and a second pilot member carried by and in axial alignment with the machining tool adapted for advancement behind the machining tool into the previously machined portion of the hole whereby during the machining operation on said unmachined portion of the hole the first mentioned pilot member, guide member and the second pilot member cooperate to axially align the locator, the portion of the hole to be machined, the machining tool and the portion of the hole previously machined.

MARION MALLORY.